Oct. 23, 1962   M. E. McCLELLAN   3,059,384
CUTTERHEAD FOR AGRICULTURAL MACHINES AND THE LIKE
Filed Jan. 3, 1961

INVENTOR.
M. E. McCLELLAN

United States Patent Office 3,059,384
Patented Oct. 23, 1962

3,059,384
CUTTERHEAD FOR AGRICULTURAL MACHINES
AND THE LIKE
Marcus E. McClellan, Ottumwa, Iowa, assignor to Deere & Company, Moline, Ill., a corporation of Delaware
Filed Jan. 3, 1961, Ser. No. 80,240
6 Claims. (Cl. 51—250)

This invention relates to an agricultural machine and more particularly to a cutterhead for reducing ensilage and other forage crops, for example.

A cutterhead of the general character referred to comprises a rotary cutter unidirectionally rotatable about an axis, normally horizontal, and having thereon a plurality of knives generally parallel to the axis of rotation (although the knives in some case may be partially helical) and operative in what may be regarded as a cutting cylinder through which the leading edges of the knives travel during normal operation. As each knife passes a fixed shear bar or the like, the crop fed to the cutter is of course reduced. The cutter is typically mounted in a housing and the speed of rotation and the design of the knives are such that the reduced crop is thrown outwardly of the housing for external handling. Since periodic use of the machine causes dulling of the knives, provision must be made for grinding these knives, and a typical relatively desirable construction is one in which the knives may be ground without removal thereof from the cutterhead. This is conventionally accomplished by holding a grinding stone or the like in proximity to the cylinder described by the knives so that the knives will be sharpened on this cylinder.

However, one disadvantage in this construction and method of use is that the entire bevel on which each knife is ground lies wholly on the cutting cylinder and therefore there is no clearance of the heel as respects the leading edge. If the knives are removed, the desirable clearance can be ground, but then one is confronted with the attendant disadvantage of replacing the knives and making sure that they are properly oriented.

According to the present invention, both disadvantages are eliminated; that is, the knives can be ground in situ and at the same time the proper clearance can be ground thereon. This is made possible by means mounting each knife for shifting between two positions, one of which is its normal cutting position and the other of which is a grinding position. The bi-positionable mounting of the knife features provision for shifting of the knife to its grinding position in such manner that the heel of the knife lies on or substantially on the cylinder described by the knife in normal operation, whereby the heel of the knife is ground on this cylinder and the knife and its carrier, as a unit, are reshifted to normal position, retracting the heel radially within this cylinder and returning the cutting edge generally to the cylinder. The invention features a novel and simple construction by means of which each knife carrier is pivotally mounted for swinging about an axis parallel to but offset to the axis of rotation, together with means for releasably holding the carrier in either its normal position or its grinding position. This feature is augmented by the further feature of means for adjusting each knife relative to its carrier.

The foregoing and other important objects and desirable features inherent in and encompassed by the invention will become apparent as a preferred embodiment thereof is disclosed in detail in the ensuing description and accompanying sheet of drawings, the several figures of which are described below.

Figure 1:
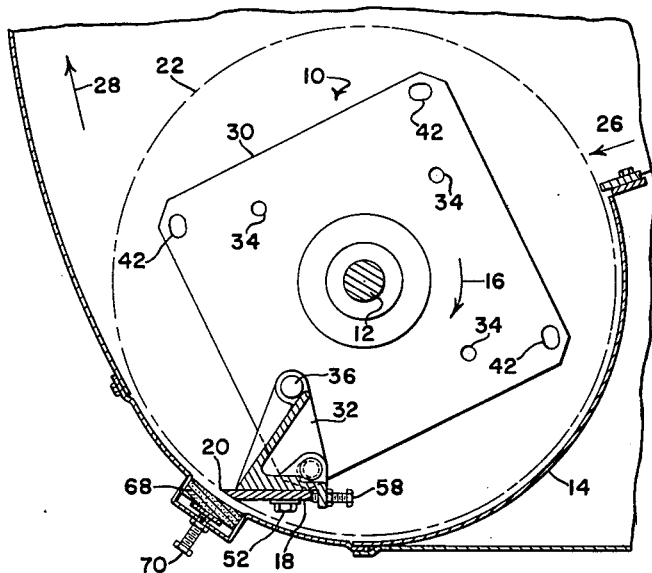
FIG. 1 is a sectional view showing a typical cutterhead embodying the inventive knife mounting, it being understood that a balanced number of knives will be provided on the cutter.
Figure 4:
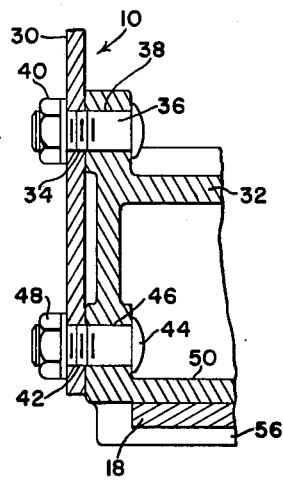
FIG. 4 is a fragmentary section on the line 4—4 of FIG. 2.

Much of what is disclosed here by way of orientation is familiar to those versed in the art and accordingly will be only briefly described. The rotary cutter is designated in its entirety by the numeral 10 and has a central shaft 12 by means of which it is mounted in a housing 14 for rotation about the axis of the shaft 12 in the direction of the arrow 16. The cutter further includes a plurality of uniformly circumferentially spaced knives, only one of which is shown at 18, and each knife has a leading edge or cutting portion 20 which, during normal operation, may be regarded as describing a cylinder 22. The housing 14 appropriately carries a fixed knife or shear bar 24 and crops fed over this shear bar in the direction of the arrow 26 are successively cut and reduced by the knives. The reduced crop is ultimately thrown out of the housing generally in the direction of the arrow 28, which is substantially tangential to the normal cutting cylinder 22.

In this particular case, the cutter design incorporates the mounting of four knives, only one of which is shown, but the presence of the others may be assumed on the basis of the fact that the cutter includes opposite end members or plates 30 which are squares, and it will be clear that a knife 18 is mounted approximately at each corner. The plates may be rigidly secured to the shaft 12 so that the plates and shaft rotate as a unit, carrying the knives therewith. Each knife is mounted between the plates 30 in spanning relation thereto, by means of a carrier 32, each carrier having opposite end portions respectively proximate to the end members or plates 30 and each end portion cooperating with its respective plate via mounting means to be presently described.

The present disclosure may be taken as typical of either of the two basic types of cutterheads. In one type, the knives 18 will be perfectly straight across and parallel to the axis of rotation as represented by the shaft 12. In the other type, the knives may be partially helical or spiral, as in the conventional lawnmower. In either case, the cutting and grinding operations are the same and accordingly the present disclosure will suffice for both types.

Each plate 30 is provided with a plurality of uniformly circumferentially spaced mounting holes 34, one of which on each plate is shown as being occupied by a pivotal fastener in the form of a bolt 36 which passes through a registering hole 38 in the proximate end portion of the carrier 32. A nut 40 is threaded onto the outer end of each bolt 36. In addition, each plate 30 has a plurality of outer holes 42, one being located approximately at each corner of the square plate. As shown, each hole 42 is in the form of a slot arcuate about the center of the hole 34. As representative of the plurality of mounting means, there is shown in the drawing a bolt 44 passed through a hole 46 in the carrier 32 and through the registering slot 42. The bolt is equipped at its outer end with a nut 48.

Each carrier has a circumferentially outermost web or flange 50 which is tapped at a plurality of locations to receive a corresponding plurality of cap screws 52, for example. The knife 18 has a corresponding number of circumferentially directed slots 54 through which the cap screws 52 are respectively passed to mount the knife 18 on the carrier. When the cap screws are loosened, the position of the knife relative to the carrier may be changed so that the knife may be advanced or retracted relative to its forward or leading direction. To facilitate this adjustment of the knife, the carrier has a rear web 56 which carries a plurality of adjusting screws 58, each of which is equipped with a lock nut 60.

Figures 2, 3:
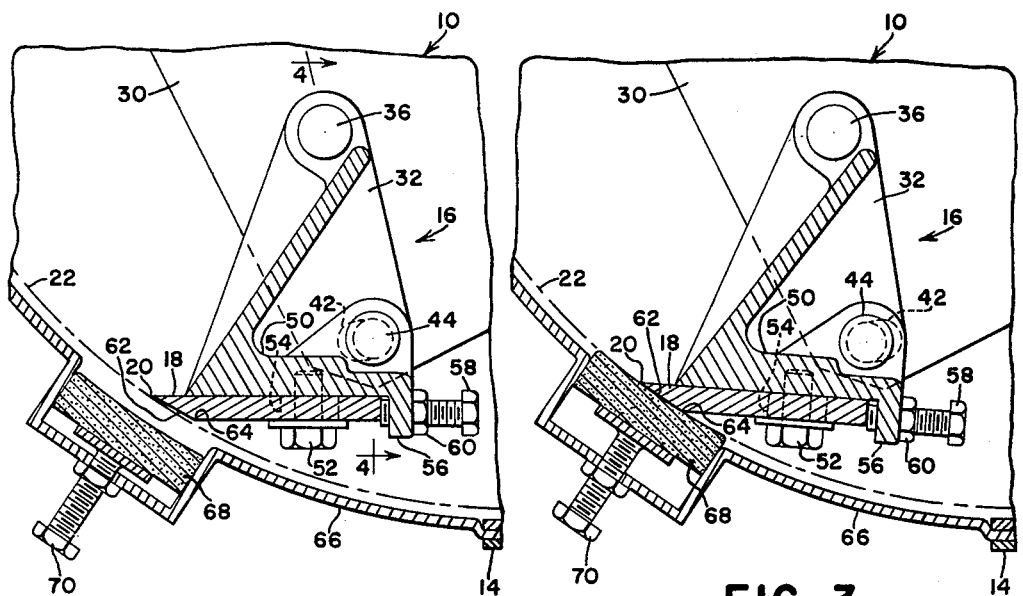
FIG. 2 is an enlarged fragmentary section of one of the carrier-knife units showing its relationship to a cylinder described by the leading edge of the knife during normal cutting operations.
FIG. 3 is a similar view but showing the knife-carrier unit in its grinding position.

The first consideration of the normal condition of the cutter is to regard the knife 18 and its carrier 32 as a unit and to note that it is mounted on the cutter in a normal position as shown in FIGS. 1 and 2. It is a characteristic of this position that the carrier is in its rear or trailing position, as evidenced by the fact that the bolt 44 contacts the rear or trailing end of the arcuate slot or hole 42. This mounts the knife 18 in such position that its leading or cutting edge 20 describes the cylinder 22 previously referred to. It will further be noted that the knife has a circumferentially outer bevel 62 which extends rearwardly or in a trailing direction from the cutting edge 20 and terminates at a heel 64. It will be readily apparent from FIG. 2 that the heel 64 is radially inwardly of the cylinder 22, thus providing desirable clearance.

As the knife wears at the cutting edge 20 and bevel 62, it may be sharpened in situ by any appropriate grinding method. A typical method and construction are illustrated here in which a portion of the housing 14, in the form of a cover 66, is shown as being permanently mounted generally as a circumferential continuation of the cylindrical portion of the housing 14. In other typical constructions, the portion 66 may be removed and replaced by a cover plate, but this is of no moment here. Suffice it to note that in the present case the cover or portion 66 carries thereon a typical grinding stone 68 having means 70 by which the stone may be moved inwardly and outwardly as respects the cylinder 22. In FIGS. 1 and 2, the stone 68 is retracted clear of the cylinder 22. In FIG. 3, the stone is moved inwardly to lie generally coincident with the cylinder, it being understood that the stone may be coextensive in length with the knife, or it may be mounted for back-and-forth movement along a line parallel to the axis of rotation as represented by the shaft 12. Again, these details are relatively unimportant. Of greater significance is the fact that the knife and carrier, as a unit, can be shifted from the position of FIG. 2 to that of FIG. 3, which latter position it occupies during the grinding phase so that the bevel 62 is ground substantially on the cylinder 22. This manner of grinding also grinds the heel 64 on the same cylinder, which is made posisble by the fact that the carrier 32 is shifted forwardly or in the leading direction relative to the end plates 30 so that the bolt 44 contacts the forward end of the slot 42. At this time, the nuts 40 and 48 are tightened so that all knives are secured in what may be regarded as their grinding position. The cutter is then rotated with the stone 68 in the FIG. 3 position. After the grinding operation is completed, the stone is retracted to the FIG. 2 position, the nuts 40 and 48 are loosened and the carriers 32 are returned to the position represented by FIG. 2, after which the nuts 40 and 48 are again tightened. Since the knife and carrier are returned to the FIG. 2 position, the heel 64 will again have the desirable clearance relative to the cutting cylinder 22. To further augment the grinding, adjustment may be made by the means 52—58, advancing the knife 18 so that its cutting edge 20 properly occupies the cutting cylinder. The shear bar 24 may also be adjusted so as to establish the proper relationship. Another of the desirable features of the invention, in addition to the grinding of the heel 64 in the manner above noted, is that grinding of the knives in situ enables them to retain their parallelism. The mounting of the carrier 32 by means of the bolts 36 and 44 is relatively simple and enables the shift between the two basic positions noted, thus eliminating any possibility of error.

The above and other features, in addition to those enumerated, will readily occur to those versed in the art, as will many modifications and alterations in the preferred embodiment of the invention disclosed, all of which may be achieved without departure from the spirit and scope of the invention.

What is claimed is:

1. Cutter mechanism of the class described, comprising: a rotary cutter adapted for unidirectional rotation and including a shaft on the axis of rotation, a pair of coaxially spaced apart radial end members carried by the shaft, and a knife carrier spanning the end members in radially spaced relation to said shaft and having opposite end portions respectively proximate to said end elements; mounting means at each end portion for mounting said end portion on its proximate element; a knife generally parallel to and carried by the knife carrier and having a leading cutting edge adapted normally to describe a cylinder about the cutter axis as the cutter rotates, said knife having an outer bevel directed generally circumferentially in a trailing direction from said cutting edge to a heel on said knife normally located radially inwardly of said cylinder; each of the aforesaid mounting means including a pivot connecting the knife carrier end portion to the associated end member on an axis parallel to the axis of rotation and located radially inwardly of the knife, said pivots being coaxial and mounting the carrier and knife for pivotal shifting as a unit between a normal position in which said cutting edge describes said cylinder and said heel lies radially inwardly of said cylinder and a grinding position spaced in a leading direction from said normal position and in which said heel portion lies on said cylinder, each mounting means further including a releasable lock device for holding the carrier selectively in the normal position for normal cutting operation or in the grinding position so that a grinding element held substantially on said cylinder grinds the knife bevel, including the heel, whereby, upon reshifting of the knife and carrier to said normal position, the heel will again lie radially inwardly of the cylinder described by the leading edge.

2. The invention defined in claim 1 including: means mounting the knife on the carrier for adjustment relative to the carrier to advance the knife simultaneously radially outwardly and in the direction of rotation.

3. Cutter mechanism of the class described, comprising: a rotary cutter adapted for unidirectional rotation and including a rotary support, a knife carrier in radially spaced relation to the axis of rotation and mounting means mounting said carrier on the support; a knife carried by the knife carrier and having a leading cutting portion adapted normally to describe a circle about the cutter axis as the cutter rotates, said knife having an outer bevel directed generally circumferentially in a trailing direction from said cutting portion to a heel on said knife normally located radially inwardly of said circle; the aforesaid mounting means including a pivot on an axis parallel to the axis of rotation and located radially inwardly of the knife and mounting the carrier and knife for pivotal shifting as a unit between a normal position in which said cutting portion describes said circle and said heel lies radially inwardly of said circle and a grinding position spaced in a leading direction from said normal position and in which said heel portion lies on said circle, said mounting means further including a releasable lock device for holding the carrier selectively in the normal position for normal cutting operation or in the grinding position so that a grinding element held substantially on said circle grinds the knife bevel, including the heel, whereby, upon reshifting of the knife and carrier to said normal position, the heel will again lie radially inwardly of the circle described by the leading edge.

4. The invention defined in claim 3 including: means mounting the knife on the carrier for adjustment relative to the carrier to advance the knife simultaneously radially outwardly and in the direction of rotation.

5. The invention defined in claim 1, in which: each lock device includes a pair of registering apertures respectively in the associated end member and knife carrier end portion and a fastener through said apertures, one of said apertures being elongated relative to the cross-section of the fastener to enable the aforesaid shifting of said unit and to provide stops limiting the range of shifting to said normal and grinding positions, said fastener being capacitated for tightening to retain the unit in either position.

6. The invention defined in claim 3, in which: the lock device includes a pair of registering apertures respectively in the support and knife carrier and a fastener through said apertures, one of said apertures being elongated relative to the cross-section of the fastener to enable the aforesaid shifting of said unit and to provide stops limiting the range of shifting to said normal and grinding positions, said fastener being capacitated for tightening to retain the unit in either position.

References Cited in the file of this patent
UNITED STATES PATENTS

| | | |
|---|---|---|
| 679,168 | Hoyt | July 23, 1901 |
| 1,738,005 | Holm | Dec. 3, 1929 |
| 2,221,458 | Sacrey | Nov. 12, 1940 |